United States Patent [19]

Kuwaki et al.

[11] Patent Number: 5,125,706
[45] Date of Patent: Jun. 30, 1992

[54] ARTICLE HOLDING APPARATUS

[75] Inventors: Kimio Kuwaki, Ootawara; Keiji Sakurai, Tochigi; Itsuo Araki, all of Utsunomiya,, Japan

[73] Assignee: Matsushita Electric Industrial Co., Ltd., Osaka, Japan

[21] Appl. No.: 639,391

[22] Filed: Jan. 10, 1991

Related U.S. Application Data

[63] Continuation of Ser. No. 446,568, Dec. 5, 1989, abandoned.

[30] Foreign Application Priority Data

Dec. 6, 1988 [JP] Japan .................. 63-307991

[51] Int. Cl.$^5$ .................................. B66C 1/02
[52] U.S. Cl. ................... 294/65; 294/119.1; 294/907
[58] Field of Search .......... 294/65, 64.1, 119.1, 294/907, 81.2, 81.62, 902; 901/39, 40, 46; 269/21; 279/3; 414/737, 752

[56] References Cited

U.S. PATENT DOCUMENTS

| | | | |
|---|---|---|---|
| 1,519,736 | 12/1924 | Lewis | 294/65 X |
| 1,792,576 | 2/1931 | Dryon | 294/65 |
| 2,739,008 | 3/1956 | Renner | 294/902 X |
| 3,219,379 | 11/1965 | Ames | 294/64.1 |
| 3,227,299 | 1/1966 | Draxler | 414/627 X |
| 3,982,782 | 9/1976 | Bos . | |
| 4,264,405 | 4/1981 | Petrov et al. | 294/64.1 X |
| 4,423,998 | 1/1984 | Inaba et al. | 294/119.1 |

FOREIGN PATENT DOCUMENTS

| | | |
|---|---|---|
| 52-37182 | 3/1977 | Japan . |
| 54-1188 | 1/1979 | Japan . |
| 54-53093 | 4/1979 | Japan . |
| 57-37483 | 8/1982 | Japan . |
| 57-60208 | 12/1982 | Japan . |
| 58-7521 | 2/1983 | Japan . |
| 217939 | 12/1968 | U.S.S.R. ........ 294/119.1 |
| 1224317 | 3/1971 | United Kingdom . |
| 2180517 | 4/1987 | United Kingdom . |

*Primary Examiner*—Margaret A. Focarino
*Assistant Examiner*—Dean J. Kramer
*Attorney, Agent, or Firm*—Lowe, Price, LeBlanc & Becker

[57] ABSTRACT

An article holding apparatus includes a pair of sliding plates selectively movable toward or away from each other while being maintained parallel to each other. A distance between the sliding plates is adjustable. Suction pads are provided on inner surfaces of the sliding plates respectively. The suction pads may include first suction pads for holding a large article and second suction pads for holding a small article. Sensor elements may be mounted on the plates to sense whether a large or a small article is present to be handled thereby.

2 Claims, 3 Drawing Sheets

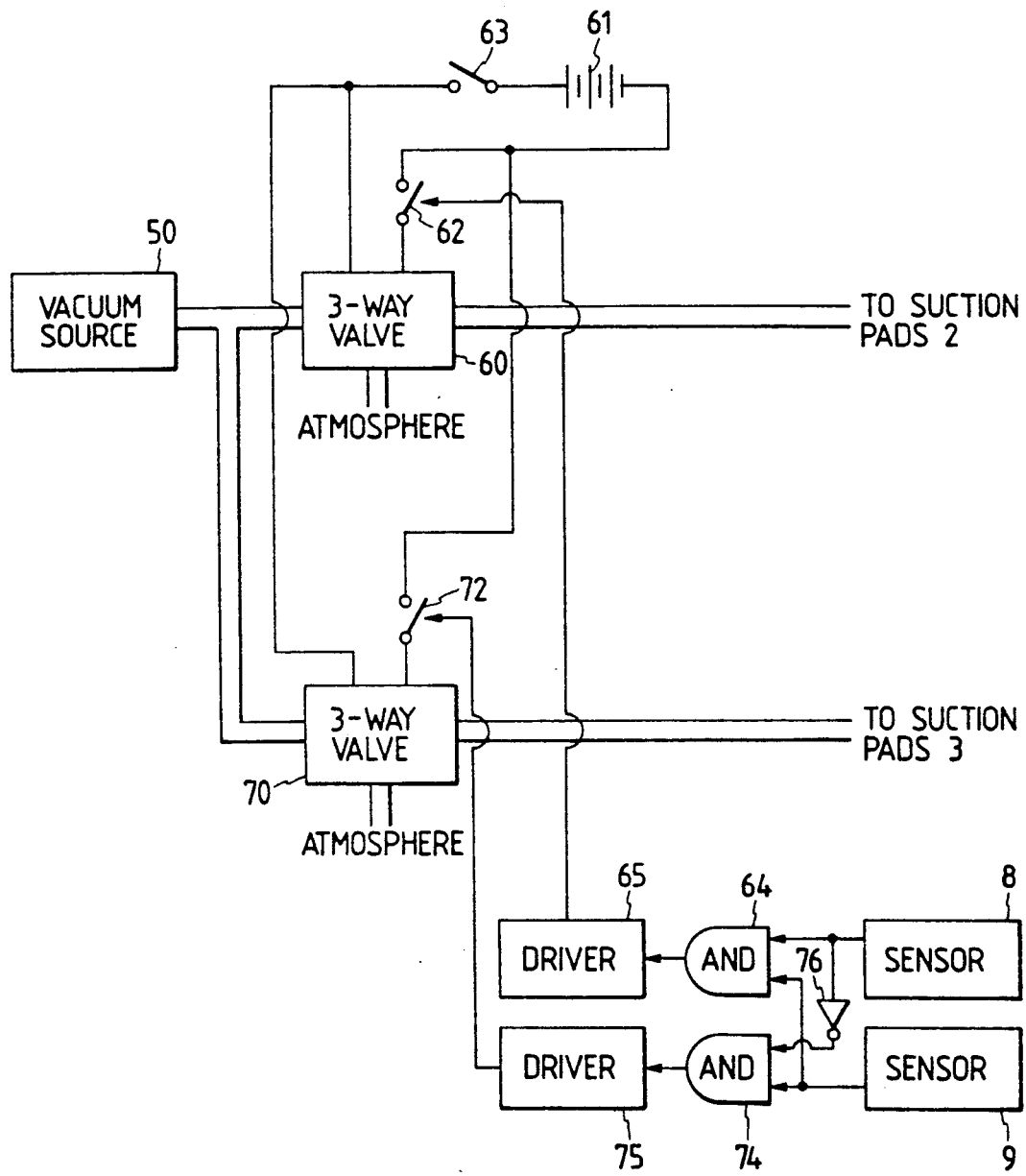

ARTICLE HOLDING APPARATUS

This application is a continuation of application Ser. No. 07/446,568 filed Dec. 5, 1989 now abandoned.

FIELD OF THE INVENTION

This invention relates to an apparatus for holding a package, such as a corrugated cardboard box, containing an article.

BACKGROUND OF THE PRIOR ART

As will be described later, known prior-art article holding apparatuses generally has a design have forms suited for a given article and can not handle various types of articles.

SUMMARY OF THE INVENTION

It is a principal object of this invention to provide an article holding apparatus that can conveniently handle articles of more than one size.

According to this invention, an article holding apparatus includes a pair of movable, slidingly supported plates. A distance between the sliding plates is adjustable with the plates maintained parallel to each other. Suction pads are provided on inner surfaces of each of the sliding plates. The suction pads may include first suction pads for holding a large article and second suction pads for holding a small article.

In another aspect of the invention, sensing means are provided whether a large or small object be handled.

BRIEF DESCRIPTION OF THE DRAWINGS

FIG. 5 is a diagram of an air control circuit in the article holding apparatus according to the preferred embodiment of this invention.

DESCRIPTION OF THE PREFERRED EMBODIMENT

Before proceeding to a detailed description of this invention, a prior-art article holding apparatus will be explained for a better understanding of this invention.

Figure 1:
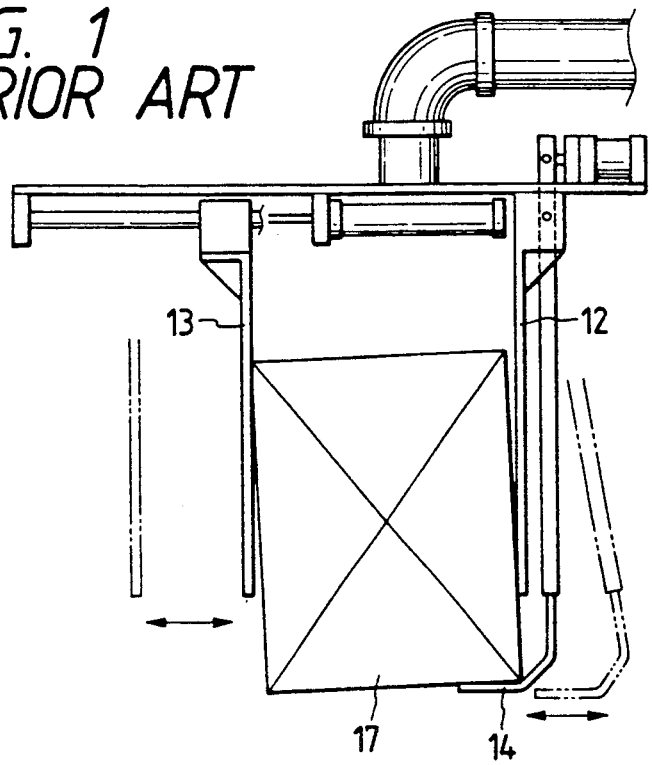
FIG. 1 is a side view of a known article-holding apparatus.

FIG. 1 shows a prior-art article holding apparatus used in a system for loading a pallet with articles contained in packages such as corrugated cardboard boxes. The prior-art article holding apparatus of FIG. 1 includes a fixed plate 12, a slidable plate 13, and a movable arm 14. Sides of a package 17 containing an article are held between the fixed plate 12 and the slidable plate 13 while a bottom of the package 17 is supported by the movable arm 14. In the case of a heavy article, the fixed plate 12 and the slidable plate 13 tend to bend during use, so that the article package 17 is liable to be held obliquely. Accordingly, the members of the prior-art article holding apparatus of FIG. 1 are designed in consideration of the weight of the article and the size of the package 17 so as to prevent oblique holding of the package 17. Thus, the prior-art article holding apparatus of FIG. 1 generally has a design exclusively suited for a given article and can not handle various types of articles.

Figure 2:
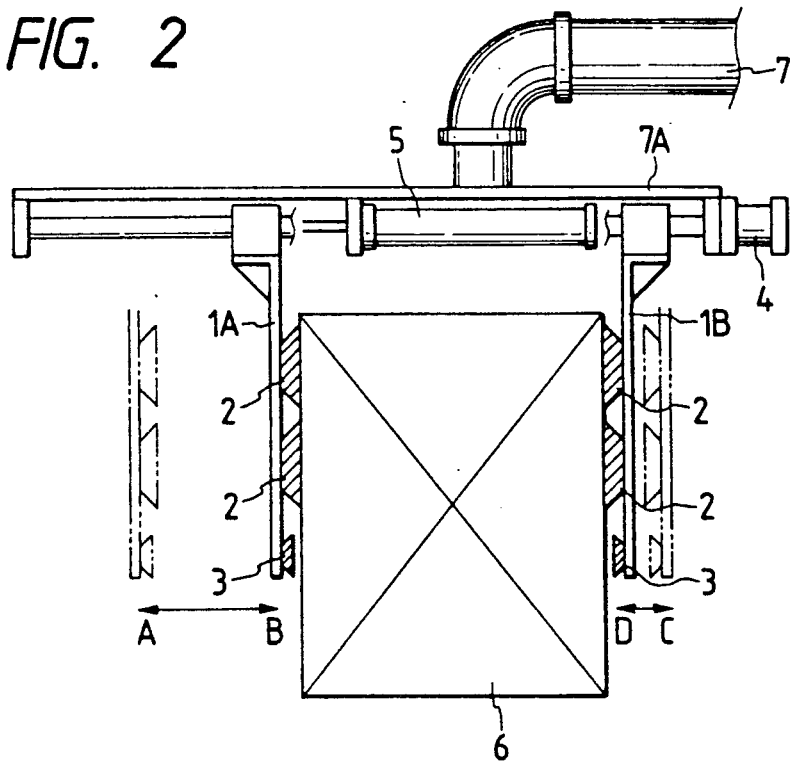
FIG. 2 is a side view of an article holding apparatus according to an embodiment of this invention.

This invention will now be explained in detail. FIG. 2 shows an article holding apparatus according a preferred embodiment of this invention. With reference to FIG. 2, a horizontally extending base 7A is fixed to an end of a robot arm 7. The bodies of pneumatic actuators or air cylinders 4 and 5 are mounted on the base 7A. A pair of vertically-extending parallel plates 1A and 1B are slidably supported on the base 7A via suitable guides (no reference characters). The plate 1A can be moved by the air cylinder 4 in a horizontal direction denoted by the arrows A and B. The plate 1B can be moved by the air cylinder 5 in a horizontal direction denoted by the arrows C and D. The direction of the movement of the plate 1A is parallel to the direction of the movement of the plate 1B. In this way, the plates 1A and 1B can be moved while always being maintained parallel relatively to each other and the distance between the plates 1A and 1B is adjustable. This is best seen in the positions of plates 1A and 1B in FIG. 2 as illustrated by solid and broken lines.

Figure 3:
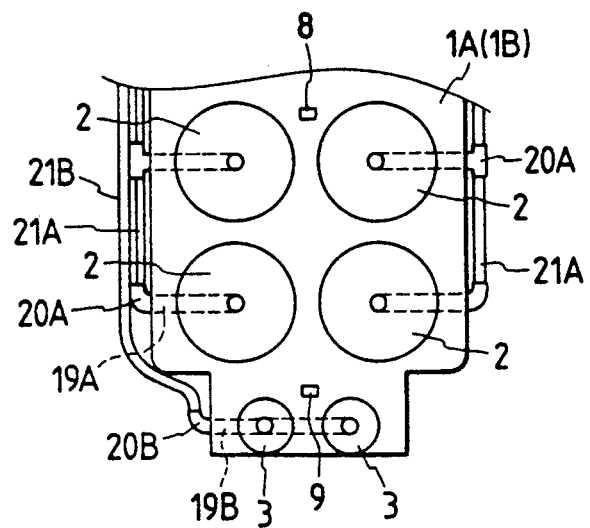
FIG. 3 is a front view of the sliding plate of FIG. 2.

As shown in FIGS. 2 and 3, pairs of opposing suction members or suction cups 2 and 3 are supported on the inner surfaces of the plates 1A and 1B. Specifically, four large suction pads 2 and two small suction pads 3 are attached to each of the opposing inner surfaces of the plates 1A and 1B. For example, the suction pads 2 and 3 are in the form of a cone or cup without a bottom wall. The large suction pads 2 on the plate 1A oppose the large suction pads 2 on the plate 1B. The small suction pads 3 on the plate 1A oppose the small suction pads 3 on the plate 1B. The large suction pads 2 are located in a higher region of the surfaces of the plates 1A and 1B while the small suction pads 3 are located in a lower region of the surfaces of the plates 1A and 1B.

Each of the plates 1A and 1B has suction passages 19A and 19B. The suction passages 19A extend from edge surfaces of the plate 1A or 1B to points of the inner surface of the plate 1A or 1B which define the centers of the interiors of the large suction pads 2. The suction passages 19B extend from an edge surface of the plate 1A or 1B to points of the inner surface of the plate 1A or 1B which define the centers of the interiors of the small suction pads 3. The suction passages 19A are connected to an air control circuit (described later) via joints 20A and hoses 21A. The suction passages 19B are connected to the air control circuit via a joints 20B and a hose 218. As will be described later, the air control circuit functions to draw air from the interiors of the suction pads 2 and 3 and to introduce air into the interiors of the suction pads 2 and 3 via the suction passages 19A and 19B and the hoses 21A and 21B.

In the case of a large package containing an article, the article holding apparatus operates as follows. After a package 6, such as a corrugated cardboard box, containing an article is placed between the plates 1A and 1B, the plates 1A and 1B are moved toward the package 6 by the air cylinders 4 and 5 until the large suction pads 2 are pressed against side surfaces of the package 6 as shown in FIG. 2. Air is drawn from the interiors of the large suction pads 2 via the suction passages 19A and the hoses 21A so that the package 6 is fixed to the large suction pads 2 and is thus held between the plates 1A and 1B. The package 6 is lifted, translated, and lowered by the robot arm 7 to a desired position while being held between the plates 1A and 1B via the large suction pads 2. When the package 6 reaches the desired position, air is introduced into the interiors of the large suction pads 2 and the plates 1A and 1B are moved away from the package 6 by the air cylinders 4 and 5 until the large suction pads 2 are separated from the side surfaces of the package 6.

Figure 4:
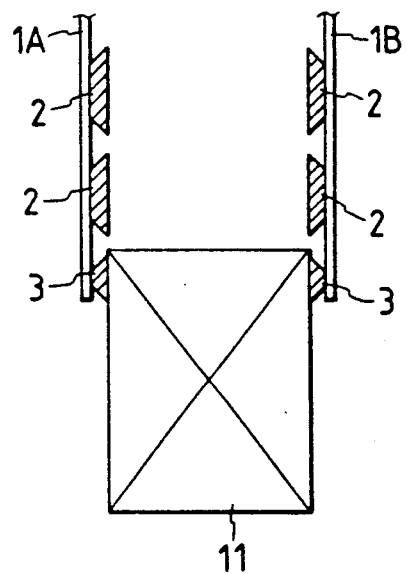
FIG. 4 is a side view of part of the article holding apparatus according to a preferred embodiment of this invention.

In the case of a small package containing an article, the article holding apparatus operates as follows. After a package 11, such as a corrugated cardboard box, containing an article is placed between the plates 1A and 1B, the plates 1A and 1B are moved toward the package 11 by the air cylinders 4 and 5 until the small suction pads 3 are pressed against side surfaces of the package 6 as shown in FIG. 4. Air is drawn from the interiors of the small suction pads 3 via the suction passages 19B and the hoses 21B so that the package 11 is fixed to the small suction pads 3 and is thus held between the plates 1A and 1B. The package 11 is lifted, translated, and lowered by the robot arm 7 to a desired position while being held between the plates 1A and 1B via the small suction pads 3. When the package 11 reaches the desired position, air is introduced into the interiors of the small suction pads 3 and the plates 1A and 1B are moved away from the package 11 by the air cylinders 4 and 5 until the small suction pads 3 are separated from the side surfaces of the package 11.

As shown in FIG. 3, sensors 8 and 9 are provided on the plates 1A and 1B. The sensor 8 includes a pair of a light-emitting element and a light-receiving element which are respectively attached to the points of the plates 1A and 1B immediately above the large suction pads 2. The sensor 8 functions to detect whether or not an object is present between the light-emitting element and the light-receiving element. Similarly, the sensor 9 includes a pair of a light-emitting element and a light-receiving element which are respectively attached to the points of the plates 1A and 1B immediately below the small suction pads 3. The sensor 9 functions to detect whether or not an object is present between the light-emitting element and the light-receiving element.

When the large package 6 is placed between the plates 1A and 1B, both of the sensors 8 and 9 detect the large package 6 so that both of the sensors 8 and 9 output "1" signals. When the small package 11 is placed between the plates 1A and 1B, only the sensor 9 detects the small package 6 so that only the sensor 9 outputs a "1" signal. When there is no package between the plates 1A and 1B, both of the sensors 8 and 9 output "0" signals. In this way, the sensors 8 and 9 cooperate to detect whether the large package 6, the small package 11, or nothing is present between the plates 1A and 1B.

As shown in FIG. 5, a vacuum source 50 such as a combination of a suction pump and a vacuum tank is connected to a first inlet of a three-way solenoid valve 60. A second inlet of the three-way solenoid valve 60 opens to atmosphere. An outlet of the three-way solenoid valve 60 is connected to the interiors of the large suction pads 2. A control winding of the three-way solenoid valve 60 is connected across an electric power source 61 via a switch of a relay 62 and a control switch 63.

The vacuum source 50 is also connected to a first inlet of a three-way solenoid valve 70. A second inlet of the three-way solenoid valve 70 opens to atmosphere. An outlet of the three-way solenoid valve 70 is connected to the interiors of the small suction pads 3. A control winding of the three-way solenoid valve 70 is connected across the electric power source 61 via a switch of a relay 72 and the control switch 63.

Output terminals of the respective sensors 8 and 9 are connected to first and second input terminals of an AND gate 64. An ouput terminal of the AND gate 64 is connected to a control winding of the relay 62 via a driver 65. The output terminal of the sensor 8 is connected to a first input terminal of an AND gate 74 via an inverter 76. The output terminal of the sensor 9 is directly connected to the second input terminal of the AND gate 74. An ouput terminal of the AND gate 74 is connected to a control winding of the relay 72 via a driver 75.

When the large package 6 is placed between the plates 1A and 1B, both of the sensors 8 and 9 detect the large package 6 so that both of the sensors 8 and 9 output "1" signals to the AND gate 64. As a result, the AND gate 64 outputs a "1" signal to the driver 65 so that the driver 65 energizes the control winding of the relay 62 and thereby closes the switch of the relay 62. In this case, when the control switch 63 is closed, the control winding of the three-way solenoid valve 60 is energized by the electric power source 61 so that the three-way solenoid valve 60 applies a vacuum from the vacuum source 50 to the large suction pads 2. The application of the vacuum to the large suction pads 2 enables the large suction pads 2 to be fixed to the side surfaces of the large package 6. On the other hand, when the control switch 63 is opened, the control winding of the three-way solenoid valve 60 is de-energized so that the three-way solenoid valve 60 supplies atmosphere to the large suction pads 2. The supply of the atmosphere to the large suction pads 2 enables the large suction pads 2 to be separated from the side surfaces of the large package 6.

When the small package 11 is placed between the plates 1A and 1B, only the sensor 9 detects the small package 11 so that only the sensor 9 outputs a "1" signal to the AND gate 74. Simultaneously, the sensor 8 outputs a "0" signal to the inverter 76 so that the inverter 76 outputs a "1" signal to the AND gate 74. As a result, the AND gate 74 outputs a "1" signal to the driver 75 so that the driver 75 energizes the control winding of the relay 72 and thereby closes the switch of the relay 72. In this case, when the control switch 63 is closed, the control winding of the three-way solenoid valve 70 is energized by the electric power source 61 so that the three-way solenoid valve 70 applies a vacuum from the vacuum source 50 to the small suction pads 3. The application of the vacuum to the small suction pads 3 enables the small suction pads 3 to be fixed to the side surfaces of the small package 11. On the other hand, when the control switch 63 is opened, the control winding of the three-way solenoid valve 70 is de-energized so that the three-way solenoid valve 70 supplies atmosphere to the small suction pads 3. The supply of the atmosphere to the small suction pads 3 enables the small suction pads 3 to be separated from the side surfaces of the small package 11.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. An article holding apparatus comprising:

a pair of support members movable toward and away from each other while remaining parallel to each other;

means for moving the support members relative to each other;

a pair of first suction members, affixed rigidly to inner surfaces of the respective support members and disposed to be constantly opposing each other, for releasably holding an object therebetween;

a pair of second suction members, affixed to the inner surfaces of the respective support members and disposed to be constantly opposing each other, for releasably holding an object therebetween, the second suction members being larger in size than the first suction members;

means mounted to the movable support members for detecting a size of an object present between the support members and generating an object-size signal representative thereof wherein said detecting means comprises at least two sensors mounted to one of said movable support members at predetermined locations to respectively sense objects of correspondingly different sizes; and means for selecting and activating one of the pair of the first suction members and the pair of the second suction members in response to the object-size signal so that a small object will be held by the first suction members and a large object will be held by the second suction members.

2. The article holding apparatus of claim 1 wherein the object-size detecting means comprises light emitting members and corresponding light receiving members mounted on the support members.

* * * * *